US010408318B2

United States Patent
Van de Ven et al.

(10) Patent No.: US 10,408,318 B2
(45) Date of Patent: Sep. 10, 2019

(54) VARIABLE DISPLACEMENT LINKAGE MECHANISM

(71) Applicant: Regents of the University of Minnesota, Minneapolis, MN (US)

(72) Inventors: James Donald Van de Ven, Long Lake, MN (US); Shawn Richard Wilhelm, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 337 days.

(21) Appl. No.: 15/172,716

(22) Filed: Jun. 3, 2016

(65) Prior Publication Data

US 2016/0363202 A1  Dec. 15, 2016

Related U.S. Application Data

(60) Provisional application No. 62/172,864, filed on Jun. 9, 2015.

(51) Int. Cl.
*F04B 9/04* (2006.01)
*F16H 37/12* (2006.01)
*F04B 49/12* (2006.01)

(52) U.S. Cl.
CPC ........... *F16H 37/124* (2013.01); *F04B 9/042* (2013.01); *F04B 49/125* (2013.01); *F05B 2250/42* (2013.01)

(58) Field of Classification Search
CPC ...... F05B 2250/42; F01B 9/02; F02B 75/045; F02B 75/048; F02D 15/02; F16H 37/124; F04B 49/125; F04B 9/042
See application file for complete search history.

(56) References Cited

U.S. PATENT DOCUMENTS

| 6,003,429 | A | * | 12/1999 | Nakabayashi | ......... B30B 1/323 60/560 |
| 6,125,802 | A | * | 10/2000 | Pen | ...................... F02B 75/045 123/197.4 |
| 8,720,393 | B2 | * | 5/2014 | Tsay | ......................... F01B 9/06 123/192.1 |
| 9,441,483 | B2 | * | 9/2016 | Van de Ven | ............. F01B 9/02 |
| 2007/0137595 | A1 | * | 6/2007 | Greenwell | ............ F01B 3/0035 123/43 R |
| 2014/0060319 | A1 | | 3/2014 | Van de Ven et al. | |

OTHER PUBLICATIONS

Dr. James Van de Ven and Shawn Wilhelm: "Cam-Driven Variable Displacement Linkage Mechanism for Piston Machines & Multi-Displacement Piston Head", White Paper, Department of Mechanical Engineering, University of Minnesota; May 12, 2015; pp. 1-4.

* cited by examiner

*Primary Examiner* — Abiy Teka
(74) *Attorney, Agent, or Firm* — Brian D. Kaul; Westman, Champlin & Koehler, P.A.

(57) ABSTRACT

A variable displacement linkage mechanism includes a slider mechanism, a cam, a connecting link, a rocker link, and a cam follower. The connecting link is coupled to the slider through a first revolute joint. The rocker link includes a rocker end and a ground end. The rocker end is coupled to the connection link through a second revolute joint, and the ground end is coupled to ground through a third revolute joint. The cam follower is coupled to the connecting link and engages the cam. A location of the third revolute joint is adjustable relative to the first revolute joint.

19 Claims, 3 Drawing Sheets

VARIABLE DISPLACEMENT LINKAGE MECHANISM

GOVERNMENT SUPPORT

This invention was made with government support under 1414053 awarded by the National Science Foundation. The government has certain rights in the invention.

BACKGROUND

A variable displacement hydraulic pump or motor promises the potential for energy savings over throttling valve control. However, the efficiency of variable displacement machines can decrease significantly at low displacement. This can result in poor efficiency for applications operating at partial load for a significant portion of their operating cycle. Exemplary applications include hydraulic hybrid vehicles, hydrostatic transmissions for wind power, and the unique application of compressed air energy storage using a liquid piston. Thus, there is a general need to develop a hydraulic pump or motor with high efficiency across the full displacement range.

Previous variable displacement machines have utilized planar joints that suffer from a trade-off between high mechanical friction and high leakage to maintain hydrodynamic bearings.

SUMMARY

Embodiments of the present disclosure include variable displacement linkage mechanisms, and a multi-cylinder mechanism. Some embodiments of the variable displacement linkage mechanism include a slider mechanism, a cam, a connecting link, a rocker link, and a cam follower. The connecting link is coupled to the slider through a first revolute joint. The rocker link includes a rocker end and a ground end. The rocker end is coupled to the connection link through a second revolute joint, and the ground end is coupled to ground through a third revolute joint. The cam follower is coupled to the connecting link and engages the cam. A location of the third revolute joint is adjustable relative to the first revolute joint.

In accordance with other embodiments, the variable displacement linkage mechanism includes a slider mechanism, a connecting link, a rocker link, a coupler link, and a crank link. The connecting link is coupled to the slider through a first revolute joint. The rocker link includes a rocker end and a ground end. The rocker end is coupled to the connection link through a second revolute joint, and the ground end is coupled to ground through a third revolute joint. The coupler link includes a first end that is connected to the connecting link through a fourth revolute joint, and a second end that is coupled to the crank link through a fifth revolute joint. A location of the third revolute joint is adjustable relative to the first revolute joint.

Some embodiments of the multi-cylinder mechanism include a cam and a plurality of displacement blocks, such as, for example, pump blocks. Each of the displacement blocks includes a slider mechanism, a connecting link, a rocker link, and a cam follower. The connecting link is coupled to the slider through a first revolute joint. The rocker link includes a rocker end and a ground end. The rocker end is coupled to the connection link through a second revolute joint, and the ground end is coupled to ground through a third revolute joint. The cam follower is coupled to the connecting link and engages the cam. A location of the third revolute joint is adjustable relative to the first revolute joint.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
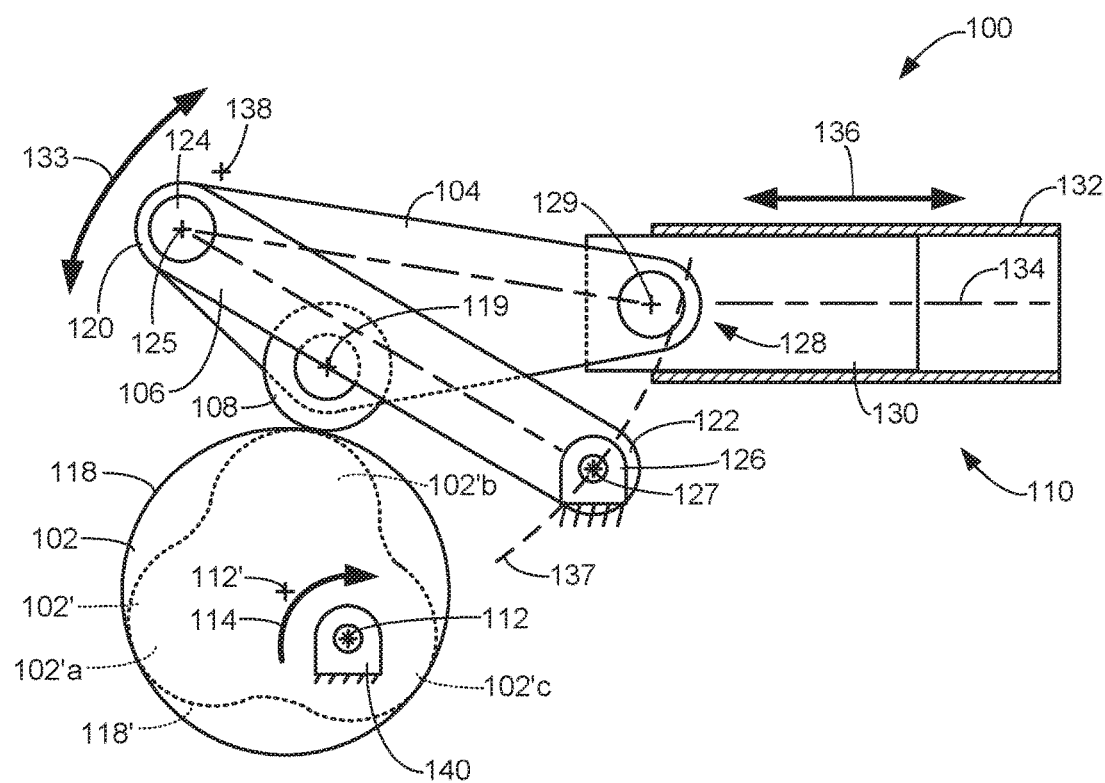
FIG. 1 is a simplified diagram of a variable displacement linkage mechanism, in accordance with embodiments of the invention.

Embodiments of the invention are described more fully hereinafter with reference to the accompanying drawings. Elements that are identified using the same or similar reference characters refer to the same or similar elements. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art.

Specific details are given in the following description to provide a thorough understanding of the embodiments. However, it is understood by those of ordinary skill in the art that the embodiments may be practiced without these specific details. For example, circuits, systems, networks, processes, frames, supports, connectors, motors, processors, and other components may not be shown, or shown in block diagram form in order to not obscure the embodiments in unnecessary detail.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, if an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. Thus, a first element could be termed a second element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a variable displacement linkage mechanism in accordance with embodiments of the invention. In some embodiments, the mechanism 100 includes a cam 102, a connecting link 104, a rocker link 106, a cam follower 108, and a slider mechanism 110. The cam 102 is configured to rotate about an axis 112 as indicated by arrow 114. When the cam 102 has a circular profile, as shown in FIG. 1, the axis 112 is displaced from a central axis 112' of the cam 102, making the cam 102 a simple eccentric cam. As mentioned below, the cam 102 can take on other profiles as desired. Additionally, while the cam 102 is illustrated as an external cam, the cam 102 may also take the form of an internal cam, or the cam 102 may be a closed (desmodromic) cam that traps the cam follower 108.

In some embodiments, the cam follower 108 is connected to the connecting link 104 and engages the cam surface 118 of the cam 102. In some embodiments, the cam follower 108 is a roller follower that rotates about an axis 119 that is substantially parallel to the axis 112 during movement of the cam 102 relative to the cam follower 108. In some embodiments, the cam follower 108 is a slide follower that slides over the surface 118 during movement of the cam 102 relative to the cam follower 108. In some embodiments, the cam follower 108 has an adjustable position relative to the connecting link 104. That is, the cam follower 108 may be relocated at various locations on the connecting link 104 using any suitable fastening techniques.

In some embodiments, the rocker link 106 has a rocker end 120 and a ground end 122. In some embodiments, the rocker end 120 is coupled to the connecting link 104 through a revolute joint 124 having an axis of rotation 125. In some embodiments, the ground end 122 is coupled to ground through a revolute joint 126 having an axis of rotation 127. In some embodiments, the revolute joints 124 and 126, as well as other joints of the mechanism 100, utilize low-friction rolling element bearings.

In some embodiments, the revolute joint 124 is configured to have an adjustable location relative to the connecting link 104 and the cam follower 108 by relocating the revolute joint 124 at a different location on the connection link 104. The adjustable location of the revolute joint 124 may be accomplished using any suitable fastening technique.

In some embodiments, the revolute joint 124 is displaced from the cam follower 108 along a plane running perpendicular to the axis of rotation 125 of the revolute joint 124, as shown in FIG. 1. Thus, in some embodiments, the revolute joint 124 is not co-located with the cam follower 108.

In some embodiments, the connecting link 104 is a single rigid unit, rather than a jointed connecting rod, as disclosed in U.S. Publication Number 2014/0060319 A1, the content of which is hereby incorporated by reference in its entirety.

In some embodiments, the connecting link 104 is coupled to the slider mechanism 110 through a revolute or slider joint 128 (hereinafter "revolute joint"), or through another suitable technique. The revolute joint 128 has an axis of rotation 129.

In some embodiments, the slider mechanism 110 comprises a slider 130, such as a crosshead bearing or piston, that is attached to the revolute joint 128. The slider 130 is configured to move within a cylinder 132, which has a fixed position relative to ground. The slider 130 pivots relative to the connecting link 104 about the axis 129 of the revolute joint. In some embodiments, side-loading of the slider 130 is prevented or reduced using conventional techniques.

In operation, when the cam 102 rotates, it pushes on the cam follower 108, creating rotation and translation of the connecting link 104, as indicated by arrow 133. The motion of the connecting link 104, which is constrained by the rocker link 106 and the slider mechanism 110, causes the slider 130 of the slider mechanism 110 to reciprocate along an axis 134, as indicated by arrow 136. The distance the slider 130 reciprocates can be actively controlled by moving the adjustable revolute joint 126 of the rocker link. When the axis of rotation 127 of the adjustable revolute joint 126 is moved in line with the axis 134, the slider 130 has zero displacement due to the rocker link 106 having the same length as the distance between the revolute joint 124 and the revolute joint 126 on the connecting link 104. That is, the length of the rocker link 106, which is the length between the axes 125 and 127, is the same as the length of the connecting link 104, which is the length between the axes 125 and 129. If the adjustable revolute joint 126 is restricted to move through the arc 137, the slider 130 reaches the same position at the end of its travel (referred to as constant top-dead-center), regardless of the location of 126 along 137. Unlike conventional variable mechanisms, in which the un-swept volume increase as the displacement decreases, the un-swept volume within the cylinder 134 is minimized and constant due to the piston reaching the same top-dead-center position regardless of the displacement.

One advantage to displacing the revolute joint 124 from the cam follower 108 is that the mechanism 100 can be formed more compactly, because at least the depth of the mechanism can be reduced as compared to the linkage mechanism of the above-referenced published application. Additionally, there is increased design freedom with regard to the possible motion profiles of the slider 130. The compactness improves not only the volume of the single cylinder 130, but makes it feasible to package a multi-cylinder mechanism in a radial arrangement, as described below.

Other advantages to the mechanism 100 of FIG. 1 is its simple part geometry and the low number of precision surfaces that are required. This simplifies the manufacture of the mechanism 100.

Figure 2:
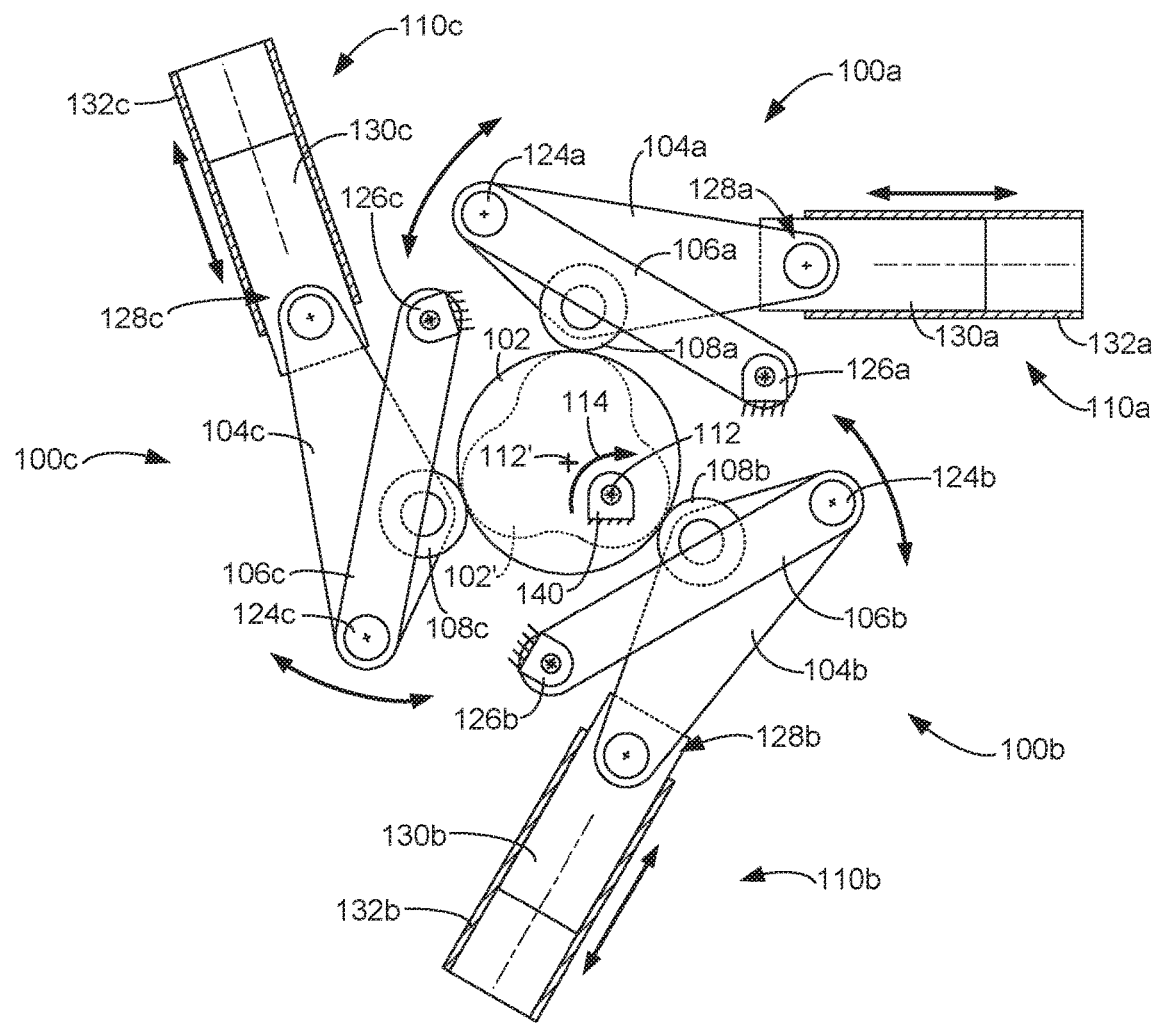
FIG. 2 is a simplified diagram of three of the linkage mechanisms of FIG. 1 in a radial configuration, in accordance with embodiments of the invention.

FIG. 2 is a simplified diagram of multiple linkage mechanisms 100 of FIG. 1 in a radial configuration, in accordance with embodiments of the invention. In the exemplary embodiment illustrated in FIG. 2, three of the mechanisms, which are designated mechanisms 100a-c, share a single cam 102, and otherwise operate in the manner described above. Elements that are referenced using the same or similar reference number correspond to the same or similar elements as those discussed above with regard to FIG. 1. Here, the connecting link 104, the rocker link 106, the cam follower 108 and the slider mechanism 110 form a displacement block, such as a pump block.

In some embodiments, the mechanisms 100a-c are angularly displaced from each other around the cam 102. In some embodiments, the mechanism 100a-c may be approximately inline with each other and displaced from each other along the axis 112' of the cam 102, for example.

In some embodiments, the profile of the cam 102 may be a circular profile forming a simple eccentric cam that rotates about the axis 112 of a cam shaft 140, as shown in FIGS. 1 and 2 and described with reference to FIG. 1. In some embodiments, the cam 102 takes the form illustrated by cam 102', shown in phantom lines, having a non-circular profile cam surface 108'. The non-circular cam surface 118' is used to control the trajectory of each of the pistons 130 during the out-stroke and the in-stroke. Thus, in some embodiments, the profile of the cam 102' controls the rate of movement of the slider 130 along its axis 134, as well as the degree of movement of the slider 130 along its axis 134, thereby controlling the rate of displaced volume from the cylinder 132 (FIG. 1). In one example, the cam surface 118' includes multiple lobes, such as lobes 102'a, 102'b and 102'c (FIG. 1), to create multiple piston strokes per revolution of the cam 102', such as about the axis 112'. This is advantageous increasing the displaced volume of each piston for each revolution of the cam shaft, especially for low-speed applications.

In some embodiments, the radial configuration of the linkage mechanisms 100 shown in FIG. 2 may have multiple operating modes for providing the desired relative movement between the cam 102 and the cam follower 108. In one exemplary operating mode, the cam 102 is rotated about the axis 112 of the cam shaft 140 while the variable displacement linkage mechanisms 100 (e.g., mechanisms 100a-c) are held in a fixed position.

In accordance with a second exemplary mode of operation, the cam 102 is held in a fixed position as the displacement blocks are rotated about the stationary cam 102 to create a kinematic inversion. This allows a valve plate to move fluid into and out of the piston-cylinders of the slider mechanism, similar to an axial piston pump. When the cam 102 has a circular profile (as shown), the rotation of the mechanisms 100 is about an axis that is offset from the central axis of the cam 102. When the cam 102' having a non-continuous profile (i.e., irregular, non-circular, lobed, etc.) is used, the mechanisms 100 can be rotated about a suitable axis, such as one that is central to the profile of the cam 102, such as axis 112', for example.

In a third exemplary mode of operation, both the variable displacement linkage mechanisms 100 and the cam 102 are rotated about respective axes relative to each other. That is, the rotation of the mechanisms 100 and the cam 102 results in the cam followers 108 of the mechanisms 100 moving relative to the surface 118 of the cam 102, or the surface 118' of the cam 102', for example. This creates two degrees of freedom for the pump. This is advantageous for use in a power split transmission where a portion of the power is transmitted hydraulically while another portion is transmitted mechanically.

Figure 3:
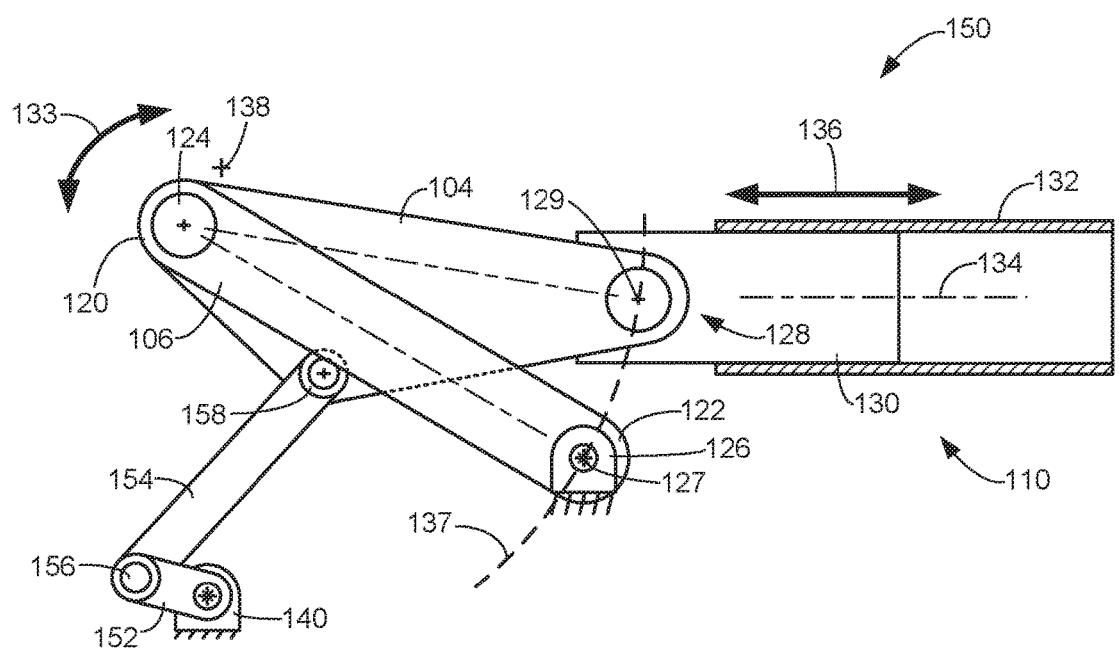
FIG. 3 is a simplified diagram of a variable displacement linkage mechanism, in accordance with embodiments of the invention.

FIG. 3 is a simplified diagram of a variable displacement linkage mechanism 150 in accordance with embodiments of the invention. Elements of the mechanism 150 that are identified using the same or similar reference characters as that used to describe the mechanism 100, correspond to the same or similar elements. In general, the mechanism 150 differs from the mechanism 100 by replacing the cam 102 and the cam follower 108 with a crank link 152 and a coupler link 154. In some embodiments, the coupler link 154 is connected to the crank link 152 through a revolute joint 156, and the coupler link 154 is connected to the connecting link 104 through a revolute joint 158. The resultant mechanism 150 operates substantially similarly to the mechanism 100 described above.

Unlike the mechanism of the above-referenced published application, which shares a pivot or revolute joint between the coupler link, the rocker link, and the connecting link, embodiments of the mechanisms 100 and 150 displace the location at which the coupler link 154 or the cam follower 108 is coupled to the connecting link 104 from the coupling of the end 120 of the rocker link 106 to the connecting link 104. This provides additional design freedom, which allows for trade-offs between force and displacement, as well as improved packaging.

The connecting link 104 imposes a side-load on the slider 130 of the slider mechanism 110 in both the cam-driven mechanism 100 and the crank-driven mechanism 150. This side-load is reacted with a linear bearing of the slider mechanism 110, which can be the slider 130 itself, or a crosshead bearing. For high pressure applications, the required surface area of the linear bearing requires a long slider 130 or a larger diameter crosshead bearing 128.

In addition to the side-loading, the peak pressure and the cross-sectional area of the slider 130 determine the force applied to the mechanism 100 or 150, which drives the sizing of the links and bearings. The same linkage designed for a small-diameter, high-pressure slider 130 can be used for a large-diameter, low-pressure slider 130, if the force applied to the linkage is the same. In some embodiments, the presence of the large diameter crosshead bearing 128 can be used to extend the capabilities of the pump or machine 100 or 150.

Figure 4:
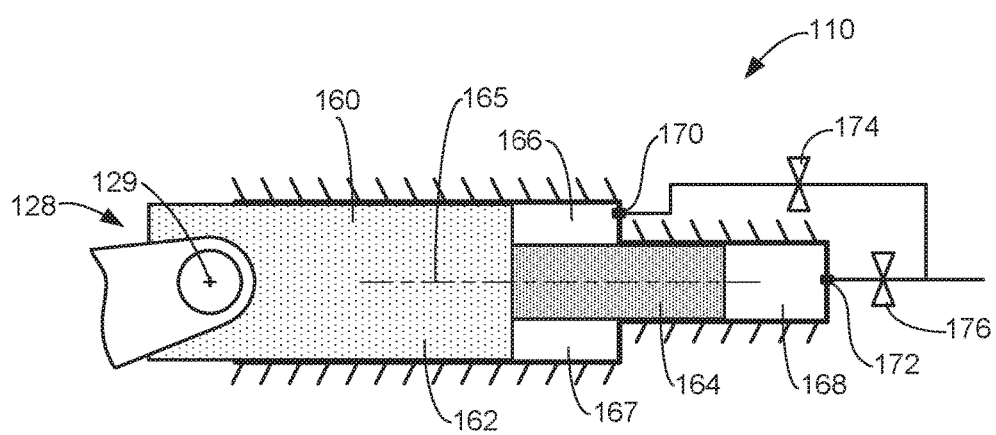
FIG. 4 is a simplified diagram of a multi-displacement slider mechanism, in accordance with embodiments of the invention.

FIG. 4 is a simplified diagram of a multi-displacement slider mechanism 110 in accordance with embodiments of the invention, that may be used with embodiments of the variable displacement linkage mechanism described herein. In some embodiments, the slider mechanism 110 includes a multi-displacement piston head 160 comprising a low pressure piston 162 and a high pressure piston 164. The diameter of the low pressure piston 162 is greater than the diameter of the high pressure piston 164. In some embodiments, the low pressure piston 162 can use the large diameter crosshead bearing 128 for the low pressure piston 162, as shown in FIG. 4.

In some embodiments, the multi-displacement piston head 160 moves along an axis 165 of a cylindrical chamber 166, which includes a low pressure chamber 167 housing the low pressure piston 162, and a high pressure chamber 168 housing the high pressure piston 164. The low pressure piston 162 displaces the volume in the chamber 167, and the high pressure piston 164 displaces the volume in the chamber 168.

In some embodiments, the chamber 167 includes a port 170 and the chamber 168 includes a port 172. The flow of material (e.g., liquid or gas) from the chamber 166 through the port 170 is controlled by a valve 174, while the flow of material through the port 172 from the chamber 168 is controlled by a valve 176.

In some embodiments, the piston head 160 can provide three useful configurations: 1) material flow is driven using the high pressure piston 164 (valve 174 is closed, and valve 176 is open); 2) material flow is driven using the low pressure piston 162 (valve 174 is open, and valve 176 is closed); and 3) material flow is driven using both the high pressure piston 164 and the low pressure piston 162 (both valves 174 and 176 are open). Configuration 1) may be used for low-flow applications up to high pressures, configuration 2) may be used for high-flow applications at low pressures, and configuration 3) may be used to create an intermediate piston displacement for medium flows and pressures depending on the relative area of the two chambers 166 and 168. As the large diameter crosshead bearing piston 162 would only be exposed to low pressures, a low-friction seal can be used, which is important as the seal is acting on a large circumference.

Some embodiments include a pump using the multi-displacement piston head 160 with or without one of the variable displacement linkage mechanisms described above. One exemplary benefit of the multi-displacement piston head 160 is that it extends the capabilities of a displacement block or pump block. Quite often, the operation of a pump is analyzed on a pressure versus flow rate plot. In many applications, the pump does not need to operate at the corner of peak pressure and peak flow rate, however, with a single displacement piston head, the pump must be designed for operating at this corner condition as the piston cross-sectional area and linear travel determine the volume displaced per stroke, while the pressure on the piston area determines the applied force. Thus, the links and bearings of the pump must be designed for large volumetric displacement and large forces, resulting in a large and heavy machine with large parasitic losses. The multi-displacement pump head 160 allows the main piston of the pump to be designed for high pressure at a lower volumetric displacement, and then extend the pump capabilities into higher flow rates at limited pressures by using the larger cross-sectional area of the main piston 162 and crosshead bearing 128. Similar benefits may be realized for a motor, such as higher torque output at lower pressures by taking advantage of the three configurations.

Although the present invention has been described with reference to preferred embodiments, workers skilled in the art will recognize that changes may be made in form and detail without departing from the spirit and scope of the invention.

What is claimed is:

1. A variable displacement linkage mechanism comprising:
   a slider mechanism;
   a cam;
   a connecting link coupled to the slider through a first revolute joint;
   a rocker link having a rocker end and a ground end, the rocker end coupled to the connecting link through a second revolute joint, and the ground end coupled to ground through a third revolute joint; and
   a cam follower coupled to the connecting link and configured to engage the cam;
   wherein:
      the connecting link rotates relative to the slider about a first axis of rotation, wherein the first axis of rotation is defined by the first revolute joint and has a fixed position relative to the connecting link and the slider;
      the connecting link rotates relative to the rocker link about a second axis of rotation, wherein the second axis of rotation is defined by the second revolute joint and has a fixed position relative to the connecting link and the rocker link;
      the rocker link rotates relative to the ground end about a third axis of rotation, wherein the third axis of rotation is defined by the third revolute joint and has a fixed position relative to the rocker link and the ground end;
      a location of the third revolute joint and the third axis of rotation is adjustable relative to the first revolute joint and the first axis of rotation; and
      the cam follower includes a roller follower having an axis of rotation that is non-coaxial to the second axis of rotation.

2. The linkage mechanism according to claim 1, wherein the first axis of rotation is non-coaxial to the second axis of rotation of the second revolute joint, and a location of the second revolute joint and the second axis of rotation is adjustable relative to the connecting link.

3. The linkage mechanism according to claim 1, wherein a location of the cam follower is adjustable relative to the connecting link.

4. The linkage mechanism according to claim 3, wherein the cam follower comprises a roller follower or a slide follower.

5. The linkage mechanism according to claim 4, wherein the cam has a circular profile.

6. The linkage mechanism according to claim 4, wherein the cam has a non-circular profile.

7. The linkage mechanism according to claim 3, wherein the slider mechanism comprises a crosshead bearing or a piston in a cylindrical chamber.

8. The linkage mechanism according to claim 3, wherein the slider mechanism comprises:
   a multi-displacement piston head including a low pressure piston having a first diameter, and a high pressure piston having a second diameter that is less than the first diameter; and
   a chamber containing the multi-displacement piston head, the chamber including a low pressure chamber housing the low pressure piston, and a high pressure chamber housing the high pressure piston.

9. A multi-cylinder mechanism comprising:
   a cam;
   a plurality of displacement blocks, each displacement block comprising:
      a slider mechanism;
      a connecting link coupled to the slider through a first revolute joint;
      a rocker link having a rocker end and a ground end, the rocker end coupled to the connecting link through a second revolute joint, and the ground end coupled to ground through a third revolute joint; and
      a cam follower coupled to the connecting link and configured to engage the cam;
      wherein:
         the connecting link rotates relative to the slider about a first axis of rotation, wherein the first axis of rotation is defined by the first revolute joint and has a fixed position relative to the connecting link and the slider;
         the connecting link rotates relative to the rocker link about a second axis of rotation, wherein the second axis of rotation is defined by the second revolute joint and has a fixed position relative to the connecting link and the rocker link;
         the rocker link rotates relative to the ground end about a third axis of rotation, wherein the third axis of rotation is defined by the third revolute joint and has a fixed position relative to the rocker link and the ground end;
         a location of the third revolute joint and the third axis of rotation is adjustable relative to the first revolute joint and the first axis of rotation; and wherein the cam follower includes a roller follower having an axis of rotation that is non-coaxial to the second axis of rotation.

10. The mechanism according to claim 9, wherein the first axis of rotation is non-coaxial to the second axis of rotation of the second revolute joint.

11. The mechanism according to claim 9, wherein a location of the second revolute joint is adjustable relative to the connecting link.

12. The mechanism according to claim 11, wherein a location of the cam follower is adjustable relative to the connecting link.

13. The mechanism according to claim 12, wherein:
the cam follower comprises a roller follower or a slide follower; and
the cam has a profile selected from the group consisting of a circular profile and a non-circular profile.

14. The mechanism according to claim 12, wherein the slider mechanism comprises a crosshead bearing or a piston in a cylindrical chamber.

15. The mechanism according to claim 12, wherein the slider mechanism comprises:
a multi-displacement piston head including a low pressure piston having a first diameter, and a high pressure piston having a second diameter that is less than the first diameter; and
a chamber containing the multi-displacement piston head, the chamber including a low pressure chamber housing the low pressure piston, and a high pressure chamber housing the high pressure piston.

16. A variable displacement linkage mechanism comprising:
a slider mechanism;
a connecting link coupled to the slider through a first revolute joint;
a rocker link having a rocker end and a ground end, the rocker end coupled to the connecting link through a second revolute joint, and the ground end coupled to ground through a third revolute joint;
a coupler link having a first end connected to the connecting link through a fourth revolute joint; and
a crank link coupled to a second end of the coupler link through a fifth revolute joint;
wherein:
the connecting link rotates relative to the slider about a first axis of rotation defined by the first revolute joint, wherein the first axis of rotation has a fixed position relative to the connecting link and the slider;
the connecting link rotates relative to the rocker link about a second axis of rotation defined by the second revolute joint, wherein the second axis of rotation has a fixed position relative to the connecting link and the rocker link;
the rocker link rotates relative to the ground end about a third axis of rotation, wherein the third axis of rotation is defined by the third revolute joint and has a fixed position relative to the rocker link and the ground end;
the connecting link rotates relative to the coupler link about a fourth axis of rotation that is defined by the fourth revolute joint, wherein the fourth axis of rotation has a fixed position relative to the connecting link and the coupler link;
the second axis of rotation of the second revolute joint is non-coaxial to the fourth axis of rotation of the fourth revolute joint; and
a location of the third revolute joint and the third axis of rotation is adjustable relative to the first revolute joint and the first axis of rotation.

17. The variable displacement linkage mechanism according to claim 16, wherein a location of the second revolute joint and the second axis of rotation is adjustable relative to the connecting link.

18. The variable displacement linkage mechanism according to claim 17, wherein a location of the fourth revolute joint and the fourth axis of rotation is adjustable relative to the coupler link.

19. The variable displacement linkage mechanism according to claim 18, wherein the slider mechanism comprises:
a multi-displacement piston head including a low pressure piston having a first diameter, and a high pressure piston having a second diameter that is less than the first diameter; and
a chamber containing the multi-displacement piston head, the chamber including a low pressure chamber housing the low pressure piston, and a high pressure chamber housing the high pressure piston.

* * * * *